United States Patent
Etter (10) Patent No.: US 10,031,638 B2
(45) Date of Patent: Jul. 24, 2018

(54) MULTI-TOUCH GUI FEATURING DIRECTIONAL COMPRESSION AND EXPANSION OF GRAPHICAL CONTENT

(71) Applicant: ETTER STUDIO LTD., Zurich (CH)

(72) Inventor: Christian Etter, Zurich (CH)

(73) Assignee: Etter Studio Ltd., Zurich (CH)

( * ) Notice: Subject to any disclaimer, the term of this patent is extended or adjusted under 35 U.S.C. 154(b) by 462 days.

(21) Appl. No.: 14/618,443

(22) Filed: Feb. 10, 2015

(65) Prior Publication Data

US 2016/0231897 A1 Aug. 11, 2016

(51) Int. Cl.
*G06F 3/0481* (2013.01)
*G06F 3/0482* (2013.01)
*G06F 3/0484* (2013.01)
*G06F 3/0488* (2013.01)

(52) U.S. Cl.
CPC .......... *G06F 3/0481* (2013.01); *G06F 3/0482* (2013.01); *G06F 3/04817* (2013.01); *G06F 3/04845* (2013.01); *G06F 3/04883* (2013.01); *G06F 2203/04806* (2013.01); *G06F 2203/04808* (2013.01)

(58) Field of Classification Search
CPC ................................ G06F 3/0481; G06F 3/048
See application file for complete search history.

(56) References Cited

U.S. PATENT DOCUMENTS

| | | | |
|---|---|---|---|
| 6,323,846 B1* | 11/2001 | Westerman | G06F 3/0235 345/173 |
| 9,122,325 B2* | 9/2015 | Peshkin | G06F 3/016 |
| 9,244,590 B1* | 1/2016 | Browder | G06F 3/04815 |
| 9,262,029 B2* | 2/2016 | Hotelling | G06F 3/0418 |
| 2002/0015024 A1* | 2/2002 | Westerman | G06F 3/0235 345/173 |
| 2007/0257890 A1* | 11/2007 | Hotelling | G06F 3/0418 345/173 |
| 2011/0007000 A1* | 1/2011 | Lim | G06F 3/03547 345/173 |

(Continued)

OTHER PUBLICATIONS

Apple Inc., "iOS Human Interface Guidelines: Interactivity and Feedback", website, accessed on Apr. 2, 2015, pp. 1-2, https://developer.apple.com/library/ios/documentation/UserExperience/Conceptual/MobileHIG/InteractivityInput.html.

(Continued)

*Primary Examiner* — William Bashore
*Assistant Examiner* — Nathan Shrewsbury
(74) *Attorney, Agent, or Firm* — Alleman Hall Creasman & Tuttle LLP (57) ABSTRACT

A computing system receives user input via a touch-interface that involves motion of one or more touches relative to the touch-interface. Responsive to the user input including two or more concurrent touches of the touch-interface involving motion in a coordinate direction, the computing system compresses graphical content within a graphical user interface in the coordinate direction toward a reference datum line. Responsive to the user input including two or more concurrent touches of the touch-interface involving motion in an opposite direction from the coordinate direction, the computing system expands graphical content within the graphical user interface in the opposite direction and away from the reference datum line.

14 Claims, 9 Drawing Sheets

(56) References Cited

U.S. PATENT DOCUMENTS

| | | | | |
|---|---|---|---|---|
| 2011/0074710 | A1* | 3/2011 | Weeldreyer | G06F 3/0481 345/173 |
| 2011/0163968 | A1* | 7/2011 | Hogan | G06F 3/04883 345/173 |
| 2011/0298830 | A1* | 12/2011 | Lam | G06F 3/04883 345/661 |
| 2012/0286847 | A1* | 11/2012 | Peshkin | G06F 3/016 327/517 |
| 2013/0132903 | A1* | 5/2013 | Krishnaswamy | G06F 3/041 715/825 |
| 2014/0215365 | A1* | 7/2014 | Hiraga | G06F 3/04883 715/765 |
| 2014/0285507 | A1* | 9/2014 | Sato | G06F 3/04845 345/582 |
| 2016/0171340 | A1* | 6/2016 | Fleishman | G06K 9/00375 382/159 |
| 2016/0188181 | A1* | 6/2016 | Smith | G06F 3/048 715/765 |

OTHER PUBLICATIONS

Android Open Source Project, "Gestures", website, accessed Apr. 2, 2015, https://developer.android.com/design/patterns/gestures.html.
Wikipedia, "Multi-touch", website, accessed Apr. 2, 2015, pp. 5-9, http://en.wikipedia.org/wiki/Multi-touch#Multi-touch_gestures.

* cited by examiner

INITIAL STATE          DIFFERENT STATE

MULTI-TOUCH GUI FEATURING DIRECTIONAL COMPRESSION AND EXPANSION OF GRAPHICAL CONTENT

BACKGROUND

Computing systems rely on user input to control their operations. User input may take various forms including keystrokes, mouse clicks, voice commands, touches of a touch-interface, etc. Computing systems that include or otherwise operatively linked with a touch-interface may support user input in the form of single-touch and multi-touch gestures involving motion of one or more touches relative to the touch-interface. Respective commands may be associated with a variety of single-touch and multi-touch gestures to control operations of the computing system. Examples include a multi-touch pinch gesture to zoom into a region of a graphical user interface and a single-touch sliding gesture to translate graphical content within the GUI, such as for scrolling or panning.

SUMMARY

According to an aspect of the present disclosure, a computing system receives user input via a touch-interface that involves motion of one or more touches relative to the touch-interface. Responsive to the user input including two or more concurrent touches of the touch-interface involving motion in a coordinate direction, the computing system compresses graphical content within a graphical user interface in the coordinate direction toward a reference datum line. Responsive to the user input including two or more concurrent touches of the touch-interface involving motion in an opposite direction from the coordinate direction, the computing system expands graphical content within the graphical user interface in the opposite direction and away from the reference datum line. This summary introduces a selection of concepts described in further detail herein. Accordingly, this summary is intended to be non-limiting with respect to the subject matter further described by the detailed description and associated drawings.

DETAILED DESCRIPTION

Users of a computing system incorporating or linked to a touch-interface benefit from a wide range of available touch-based user inputs that are supported by the computing system. Users may encounter a variety of use-scenarios while interacting with a graphical user interface (GUI) of an operating system or the near infinite quantity and variety of application programs that may be executed by the computing system. As more and more interaction happens on graphical displays within GUIs, and as graphical displays vary in size and functionality across devices, there is a growing need to display information in an intuitive and scalable manner.

The present disclosure is directed to compressing and/or expanding graphical content within a GUI in one or two dimensions responsive to motion of a touch-based user input. Within a single dimension, graphical content within the GUI is compressed toward a reference datum line responsive to motion of a touch-based user input toward the reference datum line, and the graphical content is expanded away from the reference datum line responsive to opposite motion of the touch-based user input. The touch-based user input may take the form of a pre-defined type involving a different number of concurrent touches, such as a multi-touch user input involving two or more concurrent touches, to thereby distinguish compression and expansion commands from translation-based scrolling or panning commands involving a single touch.

Figure 1:
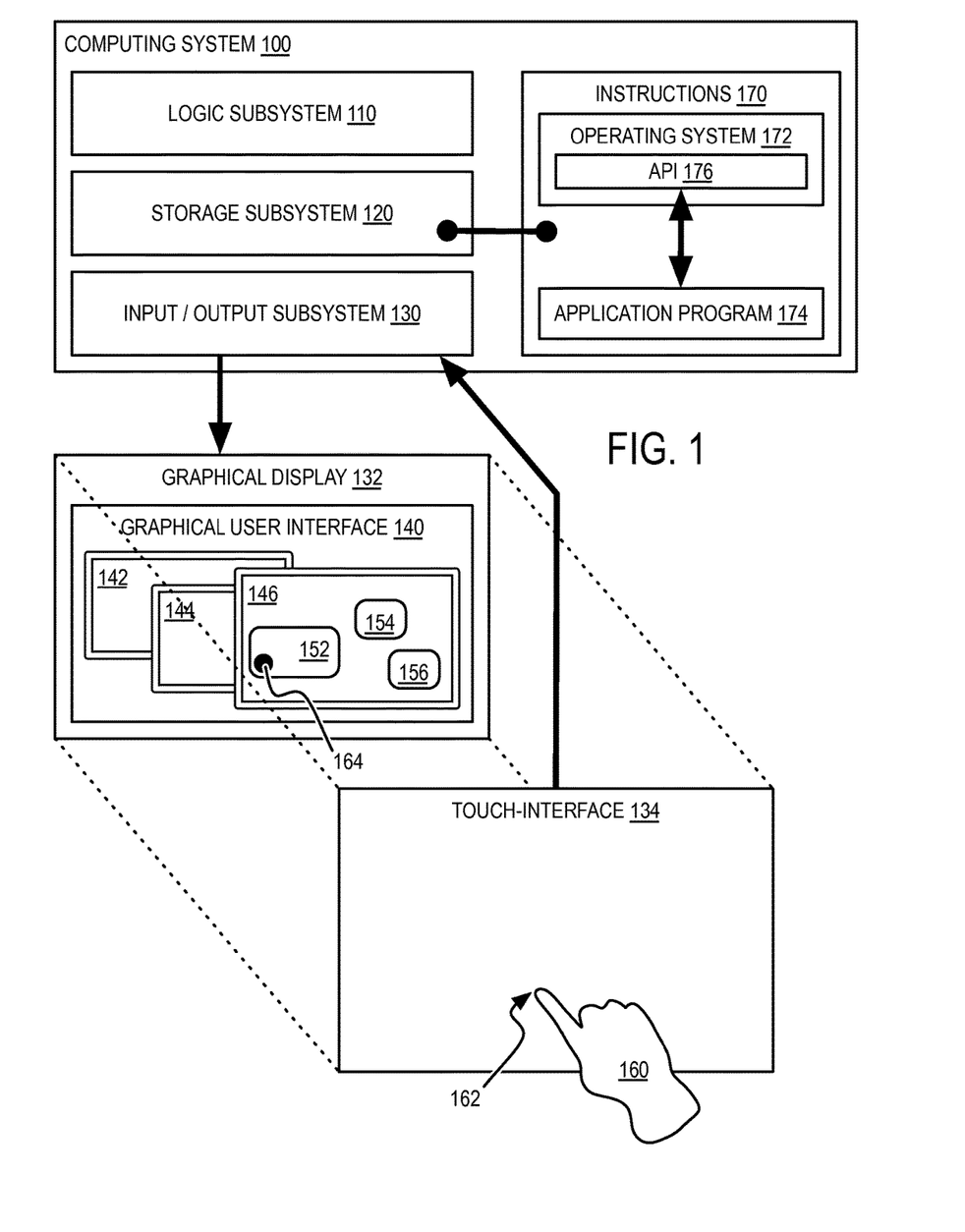
FIG. 1 is a schematic diagram depicting an example computing system.

FIG. 1 is a schematic diagram depicting an example computing system 100. Computing system 100 includes a logic subsystem 110, a storage subsystem 120, and an input/output subsystem 130. Computing system 100 may take various forms, including a personal computing device such as a desktop computer, laptop computer, tablet computer, mobile computer, media device, gaming console, wearable device, etc., a server computer, or other suitable electronic device, to name just a few examples. Computing system 100 may also take the form of two or more devices that communicate over a wired or wireless communications link, and via a communications network, such as in the case of a thin-client interacting with a remote computing device.

Computing system 100 outputs a graphical user interface (GUI) 140 for presentation at a graphical display 132 via input/output subsystem 130. Graphical display 132 may form part of and/or may be integrated with computing system 100 in a common enclosure. Alternatively, graphical display 132 may be implemented by or as a standalone device that is in communication with and operatively linked to computing system 100 via a wired or wireless communications link. GUI 140 is depicted in FIG. 1 including graphical content in the form of one or more windows 142, 144, 146, etc. Each window may include respective graphical content, such as graphical content items 152, 154, 156, etc. of window 146. Graphical content items may include an image, video, graphic, text information, etc. formed by a collection of pixels having a defined color, brightness, arrangement, etc.

Computing system 100 receives user input at a touch-interface 134 via input/output subsystem 130. Touch-interface 134 may form part of and/or may be integrated with computing system 100 in a common enclosure. Alternatively, touch-interface 134 may be implemented as or by a standalone device that is in communication with and operatively linked to computing system 100 via a wired or wireless communications link. Touch-interface 134 may use any suitable technology to identify a position of one or more touches of physical objects upon a surface or within an observed region. Such technologies may include optical sensing, capacitive sensing, resistive sensing, acoustic sensing, etc.

In at least some implementations, touch-interface 134 may be implemented in combination with graphical display 132, such as with touch-sensitive graphical displays. Non-limiting examples include tablet computers or mobile computers (e.g., mobile smart phones) that include integrated touch-sensitive display devices. In these implementations, touch interactions with touch-interface 134 correspond to the same point within GUI 140 of graphical display 132. For example, in FIG. 1, user 160 is depicted providing a single touch to touch-interface 134 at point 162 that corresponds to point 164 within GUI 140. Here, for example, user 160 is directing a user input at graphical content item 152 within GUI 140. In other implementations, the touch-interface may be a different size and/or shape than GUI 140 of graphical display 132. In these implementations, user inputs directed at touch-interface 134 may be scaled to corresponding points and/or dimensions within GUI 140. In either implementation, a user 160 may provide a touch-based user input including one or more touches to touch-interface 134 to interact with GUI 140.

Storage subsystem 120 of computing system 100 includes one or more physical, non-transitory storage devices (e.g., hard drive, flash memory device, etc.) having instructions 170 stored thereon that are executable by one or more physical, non-transitory logic devices (e.g., one or more processor devices and/or other suitable logic devices) of logic subsystem 110 to perform one or more tasks, operations, processes, etc.

Instructions 170 may include software and/or firmware held by storage subsystem 120 in non-transitory form. As a non-limiting example, instructions 170 include an operating system 172 and one or more application programs 174. An application program may include a stand-alone application program or a network-linked application program, such as a web browser that downloads and executes network resources received over a communications network. Operating system 172 may include an application programming interface (API) 176 that enables application programs 174 to interact with operating system 170 and other components of computing system 100. As an example, operating system 172 receives and processes user inputs directed at touch-interface 134, which may be communicated to an application program via API 176. The application program receives, processes, and responds to the user inputs received from the operating system, for example, by directing the operating system to update GUI 140 or a portion thereof. It will be understood that the logic subsystem of computing system 100 generates and initiates display of a GUI based on instructions held in the storage subsystem.

Figure 2:
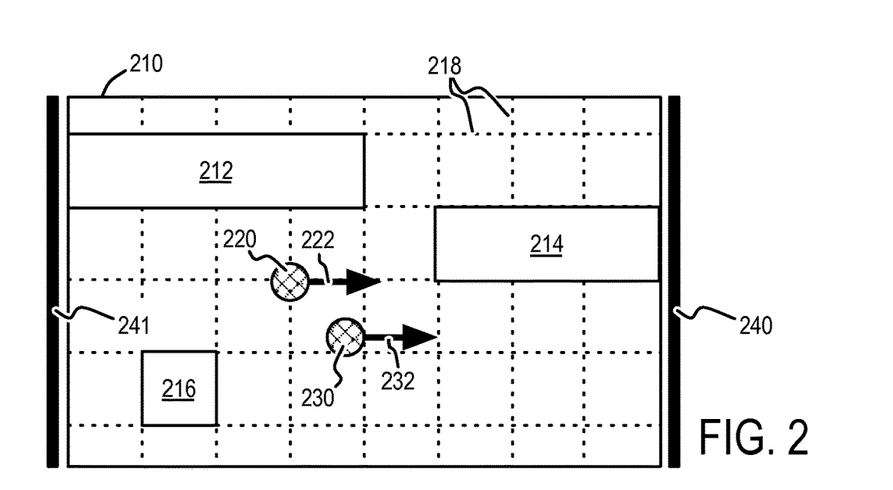
FIGS. 2-4 depict a sequence of example user interactions with an example GUI.
Figure 3:
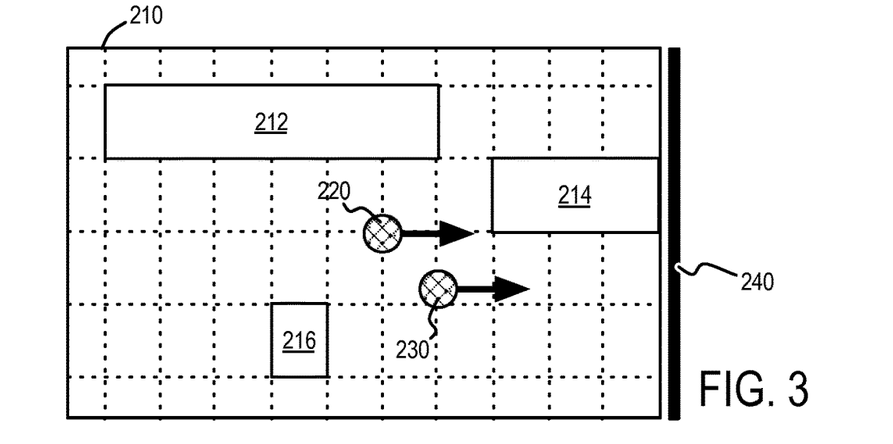
Figure 4:
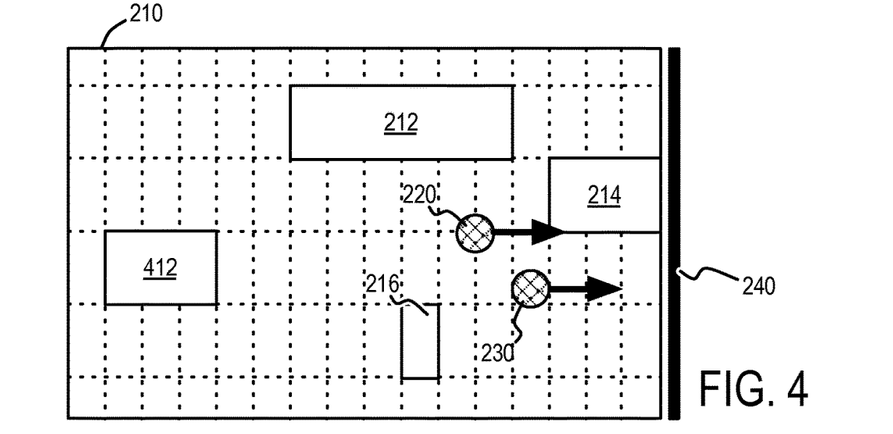

FIGS. 2-4 depict a sequence of example user interactions with an example GUI 200. GUI 200 is a non-limiting example of previously described GUI 140 of FIG. 1. GUI 200 includes graphical content in the form of graphical content items 212, 214, 216, etc. Within FIGS. 2-4, two concurrent touches of a touch-interface associated with GUI 200 are schematically depicted as touches 220 and 230. Two or more concurrent touches of a touch-interface may be referred to as a multi-touch user input. In the example depicted in FIGS. 2-4, touches 220 and 230 each involve motion relative to the touch-interface. For example, touches 220 and 230 each translate relative to the touch-interface and within associated GUI 200 as indicated by arrows 222 and 232, respectively. A multi-touch user input that moves relative to a touch-interface may be referred to as a multi-touch gesture.

Within the example sequence depicted in FIGS. 2-4, touches 220 and 230 each move in a coordinate direction (e.g., to the right in FIGS. 2-4) toward a reference datum line 240. In this example, reference datum line 240 is parallel to a vertical coordinate axis and has an axis that is perpendicular to an axis of the coordinate direction of the multi-touch gesture. Movement of touches 220 and 230 toward reference datum line 240 results in compression of graphical content within GUI 200 toward reference datum line 240 over the sequence of FIGS. 2, 3, and 4. Reference lines 218 have been provided in FIGS. 2-4 to visually represent the compression of the graphical content within GUI 140 toward reference datum line 240. It will be understood that reference lines 218 and/or reference datum line 240 are typically not presented within GUIs or otherwise included as graphical content within GUIs.

Compression in the examples depicted in FIGS. 2-4 includes a reduction in a spatial dimension of graphical content along the coordinate direction (e.g., horizontally toward the right hand side of the GUI) and along its coordinate axis (e.g., horizontal coordinate axis) that is parallel to or collinear with the coordinate direction. For example, graphical content items 212, 214, and 216 have been compressed in the horizontal spatial dimension between FIGS. 2 and 3, and further compressed in the horizontal spatial dimension between FIGS. 3 and 4. Within FIG. 3, a left hand side of graphical content item 212 has moved into view of the GUI from outside the viewable region (e.g., border of the GUI or window). Additionally, within FIG. 4, graphical content item 412 has moved into view of the GUI from outside the viewable region. Expansion of graphical content within a GUI may follow the opposite sequence from FIG. 4 to FIG. 3 to FIG. 2 responsive to motion of the user input in an opposite direction and away from the reference datum line. Expansion of graphical content may include increasing of a spatial dimension of the graphical content in the opposite direction and away from the reference datum line.

Figure 5:
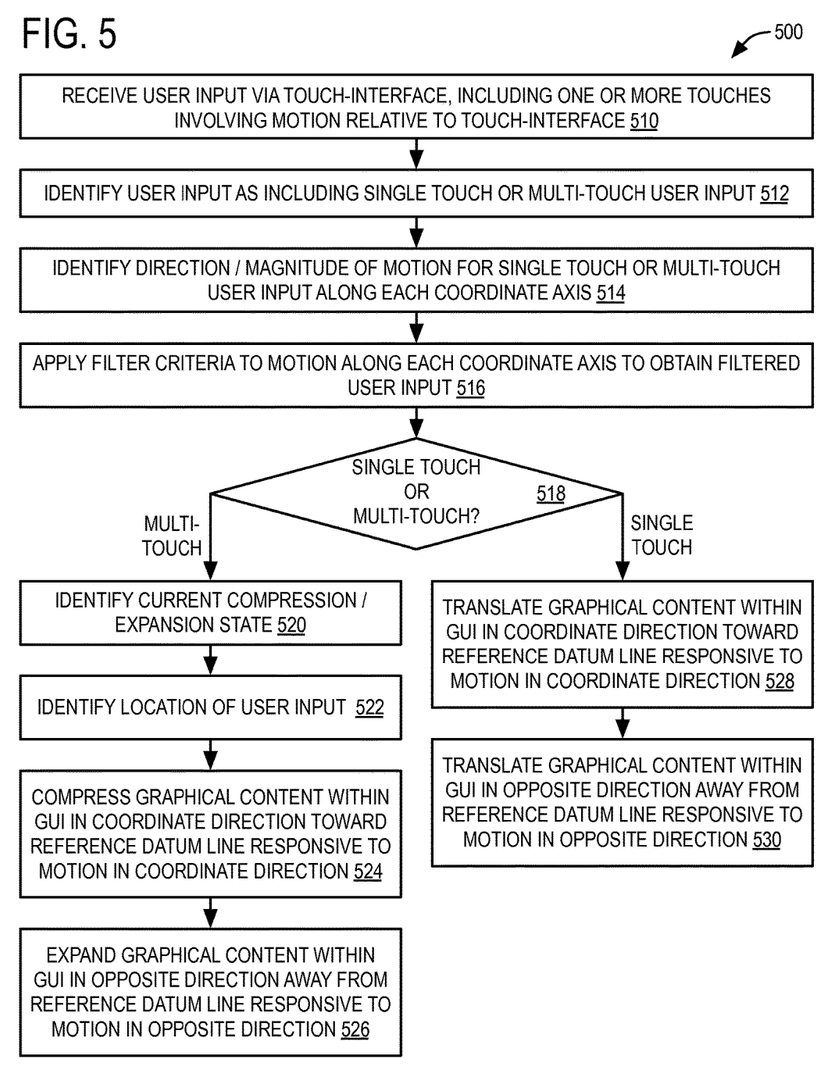
FIG. 5 is a flow diagram depicting an example method 500 for processing user input received via a touch-interface.

FIG. 5 is a flow diagram depicting an example method 500 for processing user input received via a touch-interface. Method 500 or portions thereof may be performed by a computing system, such as previously described computing system 100 of FIG. 1, for example. The computing system may include or otherwise be operatively linked to a touch-interface, which may form part of a touch-sensitive graphical display, for example. Within the context of a computing system, method 500 or portions thereof may be performed by a logic subsystem of the computing system executing instructions held in a storage subsystem of the computing system.

At 510, the method includes receiving user input via a touch-interface. The user input includes one or more touches of the touch-interface, and may involve motion relative to the touch-interface. As an example, a user may touch a surface of the touch-interface with a single touch at a first location and translate that single touch along the surface to a second location of the touch-interface. As another example, a user may touch a surface of the touch-interface with two concurrent touches at a first location or region and translate the two concurrent touches along the surface to a second location or region of the touch-interface. As yet another example, a user may touch a surface of the touch-interface with three or more concurrent touches at a first location or region and translate the two touches along the surface to a second location or region of the touch-interface. Touches may be provided by a body part of the user (e.g., a finger) or may be provided by an implement (e.g., a stylus), as non-limiting examples.

At 512, the method includes identifying whether the user input includes a single-touch user input or a multi-touch user input. A multi-touch user input includes two or more concurrent touches of the touch-interface. FIGS. 2-4 depict an example of two concurrent touches of a touch-interface, whereas FIG. 1 depicts an example of a single touch of a touch-interface. In either case, a single-touch user input or a multi-touch user input may be attributed to a touch event. Each touch event may be identified by an associated touch event identifier (e.g., assigned by the computing system) that enables the computing system to distinguish different touch events from each other. In at least some implementations, a touch event may persist for as long as each of the touches attributed to the touch event remain in contact with the touch-interface. The touch event may cease upon removal of any touch of the touch event from the touch-interface. In further implementations, a touch event may persist for as long as at least one of the touches (e.g., at least one of a single touch, or of two or more concurrent touches) attributed to the touch event remain in contact with the touch-interface.

At 514, the method includes identifying a direction and/or magnitude of motion for the touch event (e.g., including the single-touch user input or the multi-touch user input) along each coordinate axis. Motion may be measured as one or more of: (1) a distance traveled (i.e., translation) by the touch along and relative to the touch-interface, (2) a velocity of the touch, and/or (3) an acceleration of the touch. Motion of each touch received via the touch-interface may be defined by a motion vector having a direction and magnitude. A motion vector may be formed from a combination of two vector components measured along each coordinate axis of the touch-interface and/or associated GUI. For example, a motion vector may include a horizontal vector component having a direction and magnitude along the horizontal coordinate axis and a vertical vector component having a direction and magnitude along the vertical coordinate axis.

Figures 9, 10:
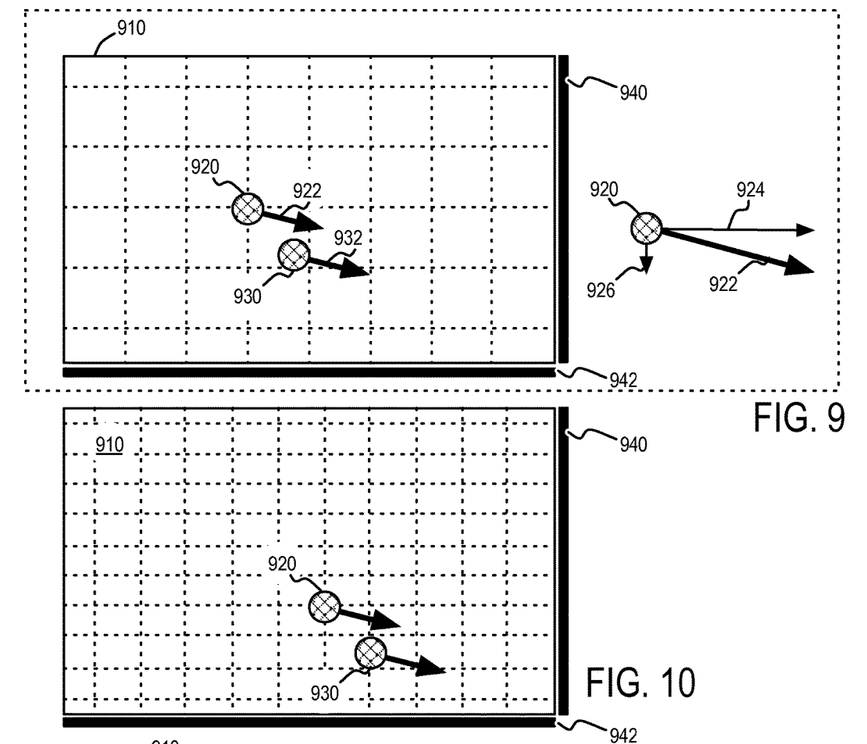
FIGS. 9-11 depict additional examples of user interactions with an example GUI involving two-dimensional motion.

FIGS. 2-4 depict touches 220 and 230 travelling in a coordinate direction that is parallel to or collinear with a coordinate axis (e.g., horizontal coordinate axis). In actual use-scenarios, user input may involve motion of one or more touches in a direction that includes vector components in two coordinate axes (e.g., horizontal and vertical coordinate axes). In this context, arrows 222 and 232 of FIGS. 2-4 may represent horizontal vector components of a user input (e.g., identified by performing operation 514) that further includes vertical vector components. FIG. 9 depicts a non-limiting example of a touch 920 having a motion vector 922 representing a distance traveled along and relative to a touch-interface. Motion vector 922 includes a horizontal vector component 924 and a vertical vector component 926. In FIG. 9, a length of each vector component represents a magnitude of distance traveled in each coordinate direction.

At 516, the method includes applying filter criteria to motion along each coordinate axis to obtain filtered user input. In at least some implementations, filtering of touch-based user input involving motion may be used to determine whether compression, expansion, translation, etc. are to be performed for the touch event, or whether the motion is insignificant or incidental to a touch-based user input intended by the user.

Vector components of the motion along two coordinate axes may be independently filtered based on the same or different the filter criteria. In at least some implementations, filter criteria may include a minimum magnitude (e.g., a minimum threshold distance of travel for a touch) along a coordinate axis to be considered a significant user input. In such case, a distance of travel of the touch along a coordinate axis that is less than the minimum threshold distance may be considered an insignificant or incidental user input and removed from the filtered user input.

Figure 11:
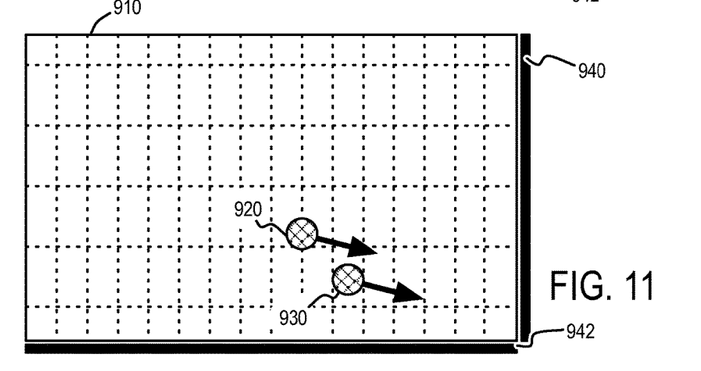

This technique may be used, for example, to resolve motion in two coordinate axes into a significant user input along a first coordinate axis and an insignificant user input along a second coordinate axis. FIG. 11, for example, depicts how touches 920 and 930 having a smaller magnitude of distance traveled in the vertical coordinate direction do not result in compression of GUI 910 toward reference datum line 942, whereas the larger magnitude of distance traveled in the horizontal coordinate direction results in compression toward reference datum line 940. By contrast, FIG. 10 depicts an example where motion in both the vertical and horizontal coordinate directions results in compression in both the horizontal and vertical coordinate directions. In the example of FIG. 10, motion along each coordinate axis has satisfied the filter criteria applied at 516 or the use of filtering at 516 may be omitted.

In at least some implementations, touch-based motion may be constrained (e.g., by an operating system and/or application program) to a single coordinate axis, such as a vertical coordinate axis or a horizontal coordinate axis. In this implementation, a lower minimum threshold distance may be applied to the single coordinate axis and a higher minimum threshold distance (e.g., an infinite threshold) may be applied to the other coordinate axis to exclude motion in that other coordinate axis. For example, FIG. 11 further depicts an example in which motion in the vertical coordinate axis is excluded, such that only motion in the horizontal coordinate axis is considered. Hence, filter criteria may be used to limit compression or expansion to a single dimension within a two-dimensional compression or expansion framework. As an illustrative example, filter criteria may be defined such that compressing graphical content within a GUI in a first coordinate direction may be preformed only if a magnitude of its vector component in the first coordinate direction is larger than a magnitude of a vector component in an orthogonal coordinate direction, and compression may not be performed in the orthogonal coordinate direction. A similar approach may be applied to expansion in one or two dimensions.

At 518, if the user input or the filtered user input includes a multi-touch user input, then the process flow proceeds to operations 520-526. The filtered user input may be used in operations 520-526 if filter criteria are applied to the user input. In implementations where filter criteria are not applied, the unfiltered user input may be used in operations 520-526. Unfiltered user input and its filtered user input may be associated with the touch event via the touch event identifier.

At 520, the method includes identifying a current compression or expansion state of the GUI or portion thereof. In at least some implementations, a GUI may support or otherwise include two or more discrete states of compression or expansion. As an example, a GUI may include a first state (e.g., a compressed state) and a second state (e.g., an expanded state). As another example, a GUI may include a first state (e.g., an expanded state), a second state (e.g., a regular state), and a third state (e.g., a compressed state). In yet another example, a GUI may include 3 or more, 10 or more, hundreds or more, thousands or more, or near infinite quantity of states to provide the appearance of continuous compression and/or expansion across a range of states. Individual states may be referred to as snap-points that enable a user to compress or expand the GUI or a targeted region of the GUI between a limited quantity of predefined snap-points, such as a maximum snap-point and minimum snap-point.

At 522, the method includes identifying a location of the user input within the GUI or portion thereof. A user may direct a touch-based user input at the GUI to define a limited region within the GUI to which compression or expansion is performed. For example, a user may direct a touch-based user input at a window or a graphical content item of a GUI to indicate focus on that window or graphical content item. Subsequent movement of the touch-based user input may limit compression or expansion to that window or graphical content item. However, compression or expansion may be applied to the entire GUI in other examples.

In at least some implementations, two reference datum lines are provided on each opposing side of the graphical content of a GUI. For example, FIG. 2 depicts a first reference datum line 240 located on the right hand side of GUI 210, and a second reference datum line 241 located on the left hand side of GUI 210. In these implementations, a location of the user input within the GUI or portion thereof may inform whether compression is to be performed toward a first reference datum line located on a first side of the graphical content or toward a second reference datum line located on a second side of the graphical content opposing the first side. Depending on implementation, compression may be performed toward the closest reference datum line or toward the furthest opposing reference datum line from the location of the user input. However, in some implementations, a single reference datum line in each supported coordinate axis (e.g., vertical and/or horizontal) may be used, and operation 522 may be optionally omitted.

At 524, the method includes compressing graphical content within a graphical user interface in the coordinate direction toward a reference datum line. The method at 524 is performed responsive to the user input including two or more touches (or another suitable pre-defined quantity of concurrent touches) of the touch-interface involving motion relative to the touch-interface in a coordinate direction. Compression performed at 524 may include compressing the graphical content in the coordinate direction by an amount that is based on a magnitude of the vector component in that coordinate direction. In at least some implementations, a scaling factor may be applied to the magnitude of the vector component in a coordinate direction to obtain a compression magnitude that defines an amount of compression in that coordinate direction.

Compressing the graphical content within the graphical user interface in the coordinate direction toward the reference datum line may include compressing the graphical content from a first state (e.g., the current state identified at 520) to a second state (e.g., a state of higher compression). Compressing from the first state to the second state may be through one or more intermediate states, and may provide the appearance of continuous compression across a range of states. As previously described, the reference datum line may be identified based on a location of the multi-touch user input event and/or the vector components of motion of the user input identified at 514.

Compression and expansion of graphical content may take various forms. In at least some implementations, compressing may include reducing a geometric size dimension of graphical content in one or more coordinate directions, and expanding may include increasing a geometric size dimension of graphical content in one or more coordinate directions.

Figure 6:
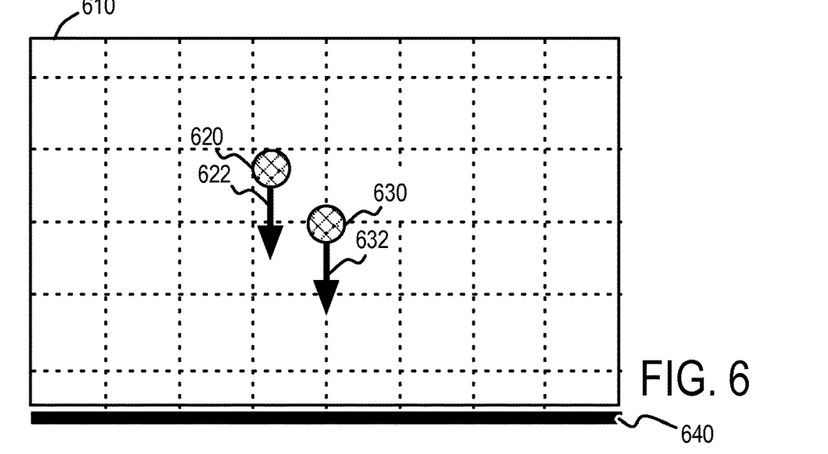
FIGS. 6-8 depict another sequence of example user interactions with an example GUI.
Figure 7:
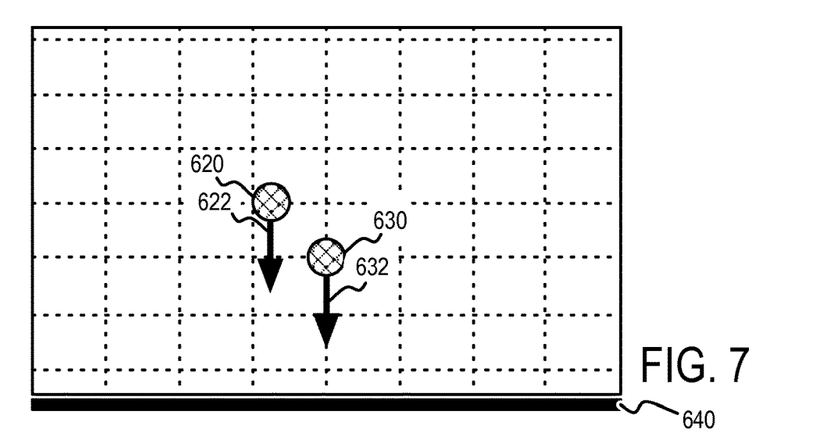
Figure 8:
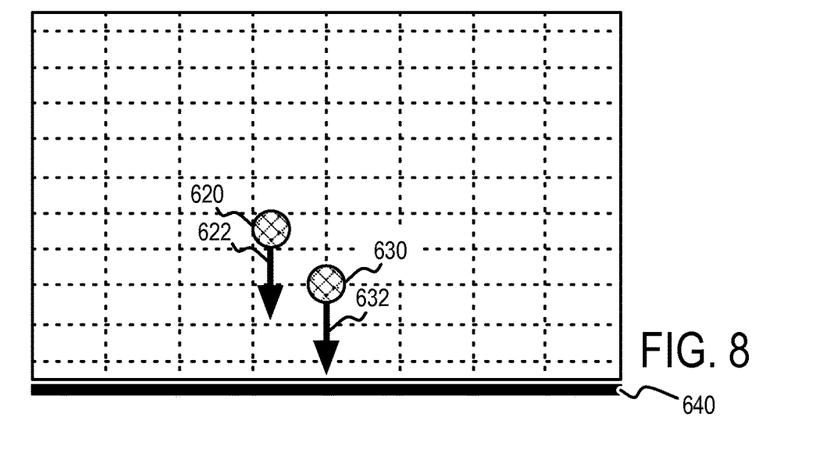

For example, FIGS. 2-4 depict compression by graphical content items 212, 214, and 216, and a spacing between reference lines 218 being reduced in size in the horizontal coordinate direction between FIGS. 2 and 3, and between FIGS. 3 and 4. As another example, FIGS. 6-8 depict compression by a spacing between reference lines being reduced in size in the vertical coordinate direction between FIGS. 6 and 7, and between FIGS. 7 and 8. As yet another example, FIGS. 9 and 10 depict compression by a spacing between reference lines being reduced in size in both the vertical coordinate direction and the horizontal coordinate direction between FIGS. 9 and 10.

Figure 12:
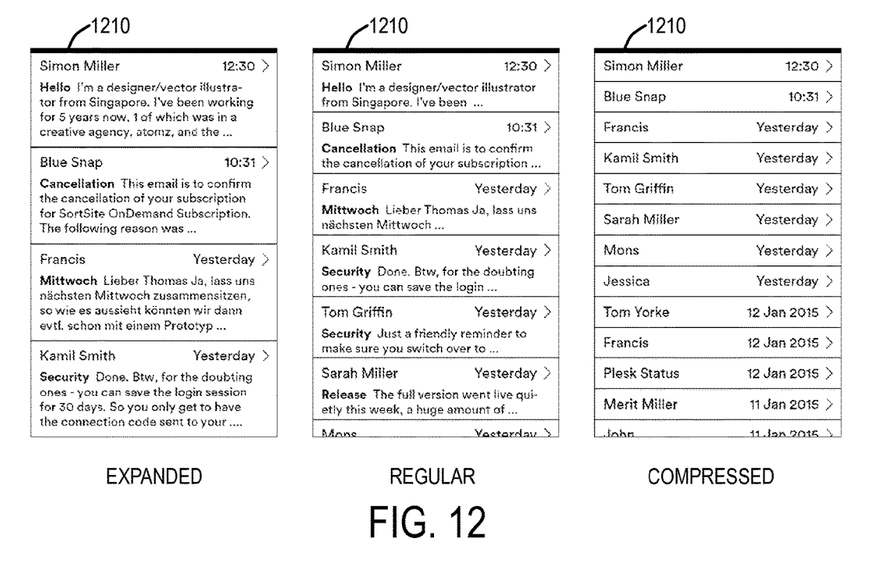
FIG. 12 depicts additional examples of user interactions with an example GUI including text content.
Figure 13:
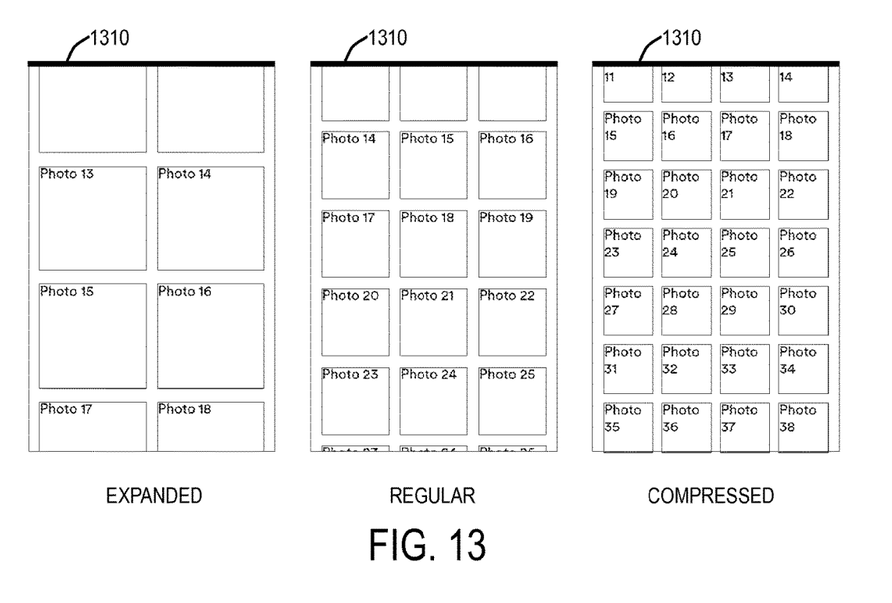
FIG. 13 depicts additional examples of user interactions with an example GUI including image content.
Figure 14:
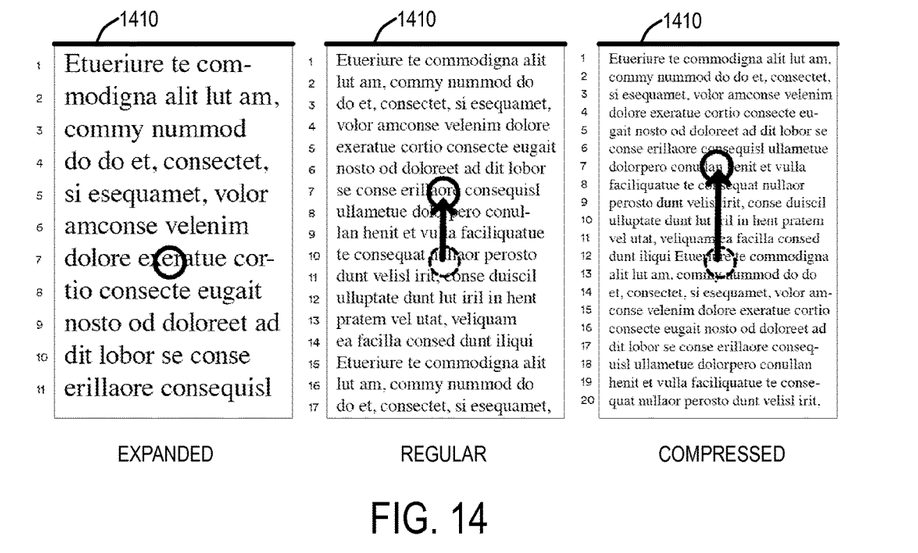
FIG. 14 depicts additional examples of user interactions with an example GUI including text content.
Figure 15:
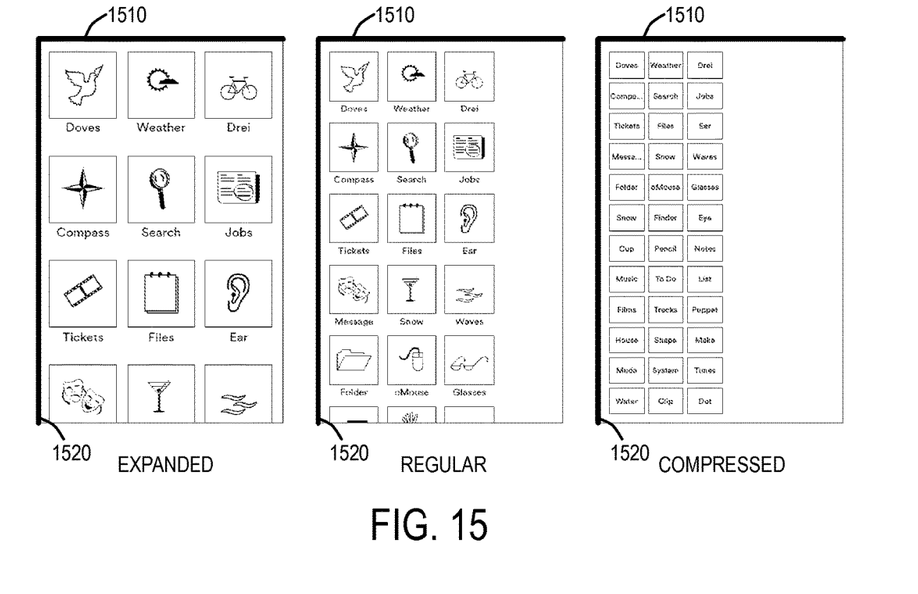
FIG. 15 depicts additional examples of user interactions with an example GUI including content that is adapted with respect to two different reference datum lines.

In further implementations, compressing and/or expanding the GUI or a portion thereof may include varying an amount and/or type of text information that is presented within a given graphical element, such as depicted in FIG. 12. In still further implementations, compressing and/or expanding the GUI or a portion thereof may include varying a spatial arrangement, size, and/or quantity of graphical elements that are presented within a given region, such as depicted in FIGS. 12, 13, and 15. In still further implementations, compressing and/or expanding the GUI or a portion thereof may include varying a text size of text information, such as depicted in FIG. 14. In still further implementations, compressing and/or expanding the GUI or a portion thereof may include varying graphical content between icons and text information, such as depicted in FIG. 15.

Compression may be performed across the GUI beginning at the touch-based user input and ending at the reference datum line. In at least some implementations, compression may begin at and applied from the furthest touch from the reference datum line (e.g., touch 220 in FIG. 2), or may be begin at and applied from the closest touch relative to the reference datum line (e.g., touch 230 in FIG. 2), or at a midpoint or weighted average between the two or more touches. In other examples, compression may be performed across the entire GUI or focus region of the GUI on the same side of the reference datum line as the touch-based user input. Compression may be linear or non-linear across these ranges. Linear compression may be used to maintain the same relative scale of graphical content along a coordinate axis, whereas non-linear compression may include greater compression nearer the reference datum line or further from the reference datum line depending on implementation.

Where two opposing reference datum lines are provided, the previously described reference datum line may refer to a first reference datum line that is perpendicular to the coordinate direction that is located on a first side of the graphical content. Method 500 may further include, responsive to the user input including two or more concurrent touches of the touch-interface involving motion relative to the touch-interface in an opposite direction to the coordinate direction, compressing the graphical content within the graphical user interface in the opposite direction toward a second reference datum line. For example, compression may be performed toward reference datum line 241 rather than toward reference datum line 240 in FIG. 2. Compression toward one of two possible opposing reference datum lines may be distinguished from expansion in either direction based on relative location of the touch-based user input identified at 522 and/or the current compression/expansion state identified at 520.

At 526, the method includes expanding graphical content within the graphical user interface in the direction opposite to the coordinate direction and away from the reference datum line. The method at 526 is performed responsive to the user input including two or more touches (or another suitable pre-defined quantity of concurrent touches) of the touch-interface involving motion relative to the touch-interface in a direction opposite to the coordinate direction. Expansion performed at 526 may include expanding the graphical content in the opposite direction by an amount that is based on a magnitude of the vector component in that opposite direction. In at least some implementations, a scaling factor may be applied to the magnitude of the vector component in the opposite direction to obtain an expansion magnitude that defines an amount of expansion in that coordinate direction.

Expanding the graphical content within the graphical user interface in the coordinate direction away from the reference datum line may include expanding the graphical content from a first state (e.g., the current state identified at 520) to a second state (e.g., a state of lesser compression). Expanding from the first state to the second state may be through one or more or many intermediate states. A quantity of states of compression or expansion may vary depending on implementation. In at least some implementations, fully compressed state may correspond to an entire view of a GUI or a portion thereof within a given field of view to provide the user with an entire view of the graphical content within one or more dimensions.

As previously described, the reference datum line may be identified based on a location of the multi-touch user input event and/or the vector components of motion of the user input identified at 514. For example, a location of the user input within the GUI or portion thereof may inform whether expansion is to be performed away from a first reference datum line located on a first side of the GUI or away from a second reference datum line located on a second side of the GUI opposing the first side. Depending on implementation, expansion may be performed away from the closest reference datum line or away from the furthest opposing reference datum line from the location of the user input.

Within the context of compression in two-dimensions involving two orthogonal coordinate axes, the above described coordinate direction may refer to a first coordinate direction, and the reference datum line refers to a first reference datum line having an axis perpendicular to an axis of the first coordinate direction. In the context of two-dimensional compression, the method at 524 further includes, responsive to the user input including two or more touches of the touch-interface involving motion relative to the touch-interface in a second coordinate direction having an axis perpendicular to the axis of the first coordinate direction, compressing graphical content within the graphical user interface in the second coordinate direction toward a second reference datum line that is perpendicular to the first reference datum line. FIG. 11 depicts compression in two-dimensions toward vertical reference datum line 940 and toward horizontal reference datum line 942 that is perpendicular to vertical reference datum line 940.

In the context of two-dimensional expansion, the method at 526 further includes, responsive to the user input including two or more touches of the touch-interface involving motion relative to the touch-interface in an opposite direction to the second coordinate direction, expanding the graphical content within the graphical user interface in the opposite direction to the second coordinate direction and away from the second reference datum line that is perpendicular to the first reference datum line. Hence, compression and/or expansion may be supported in two different dimensions using a common multi-touch user input. It will be appreciated that some implementations may support compression in a first coordinate direction with concurrent expansion in a second coordinate direction orthogonal to the first coordinate direction by applying the previously described aspects of method 500.

Alternatively, if the user input includes a single-touch user input, then the process flow proceeds to processes 528 and/or 530. At 528, the method includes translating graphical content within the graphical user interface in the coordinate direction toward the reference datum line without compressing the graphical content responsive to the user input including a single touch (or another suitable pre-defined quantity of concurrent touches) of the touch-interface involving motion relative to the touch-interface in the coordinate direction. At 530, the method includes translating graphical content within the graphical user interface in the direction opposite to the coordinate direction and away from the reference datum line without expanding the graphical content responsive to the user input including a single touch (or another suitable pre-defined quantity of concurrent touches) of the touch-interface involving motion relative to the touch-interface in the direction opposite to the coordinate direction. The method at 528 and 530 may be used to provide scrolling or panning of the GUI or a portion thereof.

While method 500 describes compression and/or expansion being performed responsive to multi-touch user inputs, and translation being performed responsive to single-touch user inputs, in other implementations, compression and/or expansion may be performed responsive to single-touch user inputs and translation maybe performed responsive to multi-touch user inputs. In further implementations, compression may be performed responsive to two concurrent touches of a multi-touch user input, expansion may be performed responsive to three or more concurrent touches of a multi-touch user input, and translation may be performed responsive to a single-touch user input. In still further implementations, compression may be performed responsive to three or more concurrent touches of a multi-touch user input, expansion may be performed responsive to two concurrent touches of a multi-touch user input, and translation may be performed responsive to a single-touch user input.

Hence, translating/panning of a GUI may be distinguished from compression and/or expansion by a quantity of concurrent touches of the GUI or GUI content or region. Similarly, compression and/or expansion may be distinguished from each other based on a quantity of concurrent touches in addition to or as an alternative to the direction of motion of the one or more touches. Within this context, operations 512 and/or 518 of method 500 may additionally or alternatively include determining a quantity of concurrent touches (e.g., single touch, two touches, three touches, four touches, five touches, etc.), in which a different quantity of concurrent touches is associated with a respective command (e.g., translate/pan, compress, expand, etc.).

In at least some implementations, the quantity of concurrent touches associated with each command may be user-defined to enable a user to set or adjust the quantity of concurrent touches associated with translating/panning the GUI or a portion thereof, compressing the GUI or a portion thereof, and/or expanding the GUI or a portion thereof. Setting or otherwise defining the quantity of concurrent touches may be on an application-specific basis, an operating system-wide basis, and/or may span two or more application programs and/or an operating system.

While the present disclosure provides numerous examples of touch-based user input that define compression, expansion, and/or translating/panning commands for a GUI, other suitable forms of user input may be used. In one example, compression and/or expansion may be performed responsive to input received via a pointing device such as a mouse. In this example, a single mouse click of a GUI or a portion thereof may provide a translating/panning command, whereas a single mouse click plus a keyboard input (e.g., concurrent pressing of a shift key of a keyboard in combination with the mouse click) provides a compression and/or expansion command. In this example, a graphical selector of the pointing device may take the form of at least one touch input, and motion of the graphical selector may define the direction of compression and/or expansion relative to one or more reference datum lines. In still further examples, voice-based user input may be used to initiate compression and/or expansion within a GUI or a portion thereof. Hence, it will be understood that different user inputs received via any suitable user input device may be used to define whether translating/panning, compression, or expansion is to be performed.

In at least some implementations, a reference datum line may correspond to a boundary of the GUI (e.g., a border of GUI 140 of FIG. 1) or a boundary of a window of the GUI (e.g., a border of window 146 of FIG. 1). In other implementations, a reference datum line may be located within a boundary of a window of the graphical user interface and may span the window. For example, a reference datum line may be confined to an individual graphical content item within a GUI. In still other implementations, a position of the reference datum line within the GUI may be user-defined. In this implementation, method 500 may further include receiving another user input defining the position of the reference datum line, or a position for each reference datum line of a plurality of reference datum lines. Application developers may define reference datum lines within their application programs to be implemented by the operating system.

Furthermore, while the examples described herein refer to compression toward a reference datum line and expansion away from the reference datum line, in other implementations, expansion may be performed toward a reference datum line in a direction of motion of the user input and/or compression may be performed away from the reference datum line in a direction of motion of the user input.

FIG. 12 depicts additional examples of user interaction with an example GUI including text content. In this example, the graphical content includes text content located within respective graphical elements (e.g., boxes). FIG. 12 depicts a non-limiting example of a GUI of an email application in which individual email summaries are provided by the respective graphical elements. FIG. 12 further depicts an example in which the email application supports three different states of expansion or compression. Within this example, compressing graphical content from the expanded state to the regular state and/or the compressed state includes revealing a greater quantity of graphical elements (e.g., representing individual emails) and smaller sized graphical elements within the graphical user interface in which each graphical element has less text information than before compression was performed. Expanding the graphical content of FIG. 12 from the compressed state to the regular state and/or the expanded state includes reducing the quantity of graphical elements and increasing the size of the graphical elements within the GUI in which each graphical element has greater text information than before expansion was performed. In at least some implementations, a font size of the text information may remain constant across expansion/compression states, or font size may vary responsive to state. In FIG. 12 compression and/or expansion is performed relative to a horizontal reference datum line 1210.

FIG. 13 depicts additional examples of user interaction with an example GUI including image content. Within FIG. 13, an array of images within the GUI changes shape to include a greater quantity of images per horizontal line of the array in the compressed state as compared to the expanded state (e.g., two vs. three images), with a reduction in the size of the images in the compressed state as compared to the expanded state. In FIG. 13 compression and/or expansion is performed relative to a horizontal reference datum line 1310.

FIG. 14 depicts additional examples of user interactions with an example GUI including text content. In FIG. 14, compression is performed toward a reference datum line 1410 by reducing the size of text information. Within FIG. 14, a greater amount of text information is presented per line of text due to the reduction in text size, along with a greater quantity of text lines per region of the GUI. Expansion may be performed in the opposite direction from the compression depicted in FIG. 14, and may include increasing a text size and reducing the amount of text information presented per line, along with a lesser quantity of text lines per region.

FIG. 15 depicts additional examples of user interactions with an example GUI including content that is adapted with respect to two different reference datum lines. In FIG. 15, reference datum lines 1510 and 1520 are orthogonal to each other. Compression in this example is toward each reference datum line and expansion is away from each reference datum line, which includes reducing the size of graphical elements and eventual replacement of graphical content within the graphical elements with text information.

Figure 16:
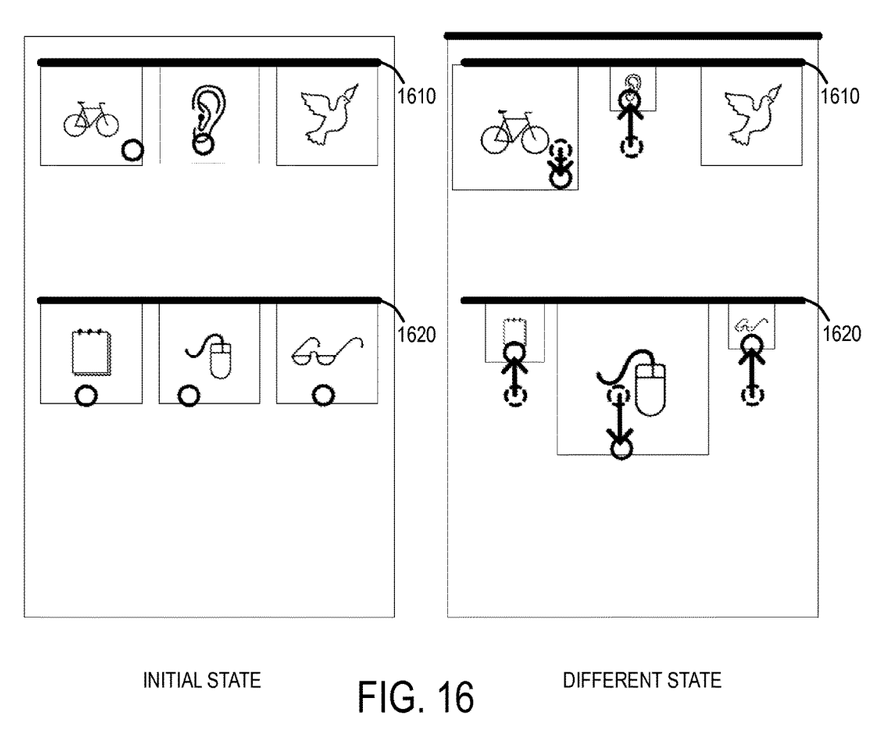
FIG. 16 depicts additional examples of user interactions with an example GUI including content that is individually compressed or expanded.

FIG. 16 depicts additional examples of user interactions with an example GUI including content that is individually compressed or expanded between two different states. For example, some graphical elements are expanded or compressed relative to reference datum line 1610, and other graphical elements are expanded or compressed relative to a different reference datum line 1620. In this example, compression and expansion includes changing a size dimension of graphical content in the coordinate direction of the reference datum line. However, FIG. 16 further depicts how compression and expansion may include changing a size dimension in other dimensions (e.g., an orthogonal coordinate axis to the coordinate direction and/or parallel to the reference datum line) to maintain the same or similar aspect ratio of graphical content.

Figure 17:
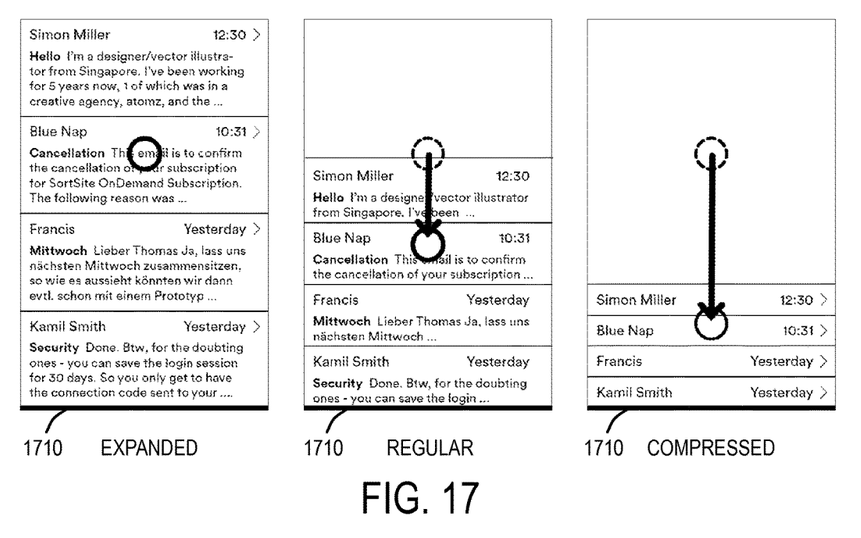
FIG. 17 depicts additional examples of user interactions with an example GUI in which free space is created by compression.

FIG. 17 depicts additional examples of user interactions with an example GUI in which free space is created by compression. In this example, similar to the previous example of FIG. 12, graphical content does not fill the GUI or region behind the user's touch-input, thereby leaving free space behind the touch-input as the input moves toward reference datum line 1710.

Figure 18:
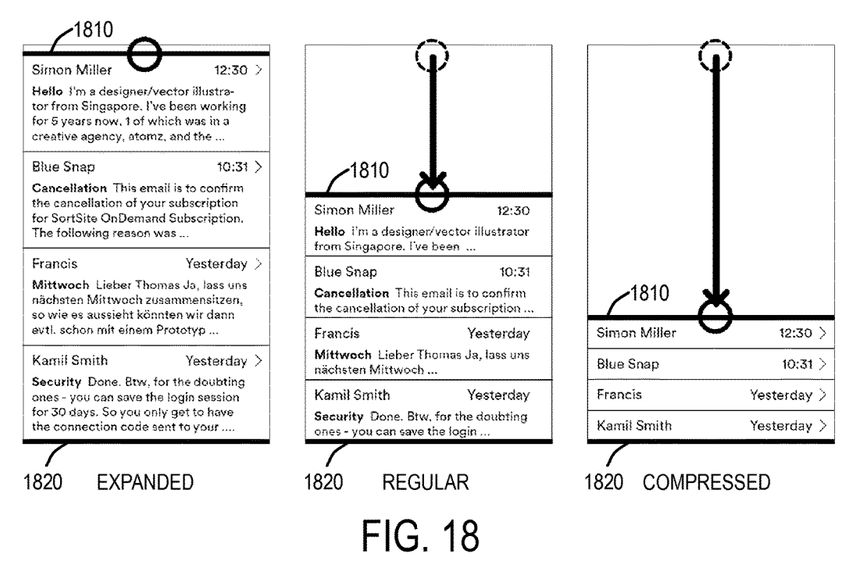
FIG. 18 depicts additional examples of user interactions with an example GUI in which a position of a reference datum line is defined by a user and moved within the GUI.

FIG. 18 depicts additional examples of user interactions with an example GUI in which a position of a reference datum line is defined by a user and moved within the GUI. In this example, a touch-input enables a user to move reference datum line 1810 closer to reference datum line 1820. In combination with movement of reference datum line 1810, compression is performed toward reference datum line 1820.

It is to be understood that the configurations and/or techniques described herein are exemplary in nature, and that specific examples or embodiments are not to be considered in a limiting sense, because numerous variations are possible. The specific methods or processes described herein may represent one or more of any number of processing strategies. As such, various acts illustrated may be performed in the sequence illustrated, in other sequences, in parallel, or in some cases omitted. Likewise, the order of the above-described processes may be changed. The subject matter of the present disclosure includes all novel and nonobvious combinations and subcombinations of the various methods, processes, systems, configurations, and other features, functions, acts, and/or properties disclosed herein, as well as any and all equivalents thereof. Variations to the disclosed embodiments that fall within the metes and bounds of the claims, now or later presented, or the equivalence of such metes and bounds are embraced by the claims.

The invention claimed is:

1. A method performed by a computing system, the method comprising:
receiving user input via a touch-interface, the user input including one or more touches of the touch-interface involving motion relative to the touch-interface, the motion defined by a first motion vector component in a first coordinate direction and a second motion vector component in a second coordinate direction that is perpendicular to the first coordinate direction;
applying filter criteria to one or more of the first motion vector component and/or the second motion vector component to exclude a magnitude of the first motion vector component and/or a magnitude of the second motion vector component from a filtered user input if less than a threshold magnitude;
responsive to the user input including two or more concurrent touches of the touch-interface involving motion relative to the touch-interface in the first coordinate direction in which each of the concurrent touches has the first motion vector component in a same first direction as the other concurrent touches along a same first coordinate axis, compressing graphical content within a graphical user interface in the first coordinate direction toward a first reference datum line that is perpendicular to an axis of the first coordinate direction based on the magnitude of the first motion vector component if included in the filtered user input following application of the filter criteria; and
responsive to the user input including two or more concurrent touches of the touch-interface involving motion relative to the touch-interface in the second coordinate direction in which each of the concurrent touches has the second motion vector component in a same second direction as the other concurrent touches along a same second coordinate axis, compressing graphical content within the graphical user interface in the second coordinate direction toward a second reference datum line that is perpendicular to the first reference datum line and to an axis of the second coordinate direction based on the magnitude of the second motion vector component if included in the filtered user input following application of the filter criteria.

2. The method of claim 1, further comprising:
responsive to the user input including two or more concurrent touches of the touch-interface involving motion relative to the touch-interface in a direction opposite to the first coordinate direction, expanding graphical content within the graphical user interface in the direction opposite to the first coordinate direction and away from the first reference datum line.

3. The method of claim 2, further comprising:
responsive to another user input including a single touch of the touch-interface involving motion relative to the touch-interface in the first coordinate direction, translating graphical content within the graphical user interface in the first coordinate direction toward the first reference datum line without compressing that graphical content in the first coordinate direction.

4. The method of claim 3, further comprising:
responsive to the another user input including a single touch of the touch-interface involving motion relative to the touch-interface in a direction opposite to the first coordinate direction, translating graphical content within the graphical user interface in the direction opposite to the first coordinate direction and away from the first reference datum line without expanding that graphical content in the direction opposite to the first coordinate direction.

5. The method of claim 1, further comprising:
responsive to the user input including two or more touches of the touch-interface involving motion relative to the touch-interface in a direction opposite to the second coordinate direction, expanding graphical content within the graphical user interface in the direction opposite to the second coordinate direction and away from the second reference datum line.

6. The method of claim 1,
wherein if the magnitude of the first motion vector component in the first coordinate direction is larger than the magnitude of the second motion vector component in the second coordinate direction, compressing the graphical content within the graphical user interface in the first coordinate direction is performed toward the first reference datum without compressing the graphical content within the graphical user interface in the second coordinate direction; and
wherein if the magnitude of the second motion vector component in the second coordinate direction is larger than the magnitude of the first motion vector component in the first coordinate direction, compressing the graphical content within the graphical user interface in the second coordinate direction toward the second reference datum line is performed without compressing the graphical content within the graphical user interface in the first coordinate direction.

7. The method of claim 1, wherein the first coordinate direction is parallel to or collinear with a horizontal coordinate axis of the graphical user interface, or wherein the first coordinate direction is parallel to or collinear with a vertical coordinate axis of the graphical user interface.

8. The method of claim 1, wherein the first reference datum line is located on a first side of a window of the graphical user interface, and wherein the method further comprises:
responsive to the user input including two or more concurrent touches of the touch-interface involving motion relative to the touch-interface in an opposite direction to the first coordinate direction, compressing graphical content within the graphical user interface in the opposite direction toward a third reference datum line on a second side of the window of the graphical user interface.

9. The method of claim 1, wherein the first reference datum line corresponds to a boundary of a window of the graphical user interface, or wherein the first reference datum line corresponds to a boundary of the graphical user interface, or wherein the first reference datum line is located within a boundary of a window of the graphical user interface and spans the window.

10. The method of claim 1, wherein a position of the first reference datum line within the graphical user interface is user-defined, wherein the method further comprises:
receiving another user input defining the position of the first reference datum line.

11. The method of claim 1, wherein the graphical content includes text content, and
wherein said compressing in the first and/or the second coordinate directions further includes revealing a greater quantity of graphical elements within the graphical user interface in which each graphical element of the greater quantity has less text information than before said compressing in the first and/or second coordinate directions.

12. The method of claim 1, wherein said compressing in the first and/or second coordinate directions includes compressing the graphical content from a first state to a second state.

13. The method of claim 12, wherein said compressing the graphical content in the first and/or second coordinate directions from the first state to the second state includes compressing the graphical content through one or more intermediate states.

14. A method performed by a computing system, the method comprising:
receiving user input via a touch-interface, the user input including one or more touches of the touch-interface involving motion relative to the touch-interface, the motion defined by a first motion vector component in a first coordinate direction and a second motion vector component in a second coordinate direction that is perpendicular to the first coordinate direction;
responsive to the user input including two or more concurrent touches of the touch-interface involving motion relative to the touch-interface in the first coordinate direction in which each of the concurrent touches has the first motion vector component in a same first direction as the other concurrent touches along a same first coordinate axis, compressing graphical content within a graphical user interface in the first coordinate direction toward a first reference datum line that is perpendicular to an axis of the first coordinate direction if a magnitude of the first motion vector component in the first coordinate direction is larger than a magnitude of the second motion vector component in the second coordinate direction; and
responsive to the user input including two or more concurrent touches of the touch-interface involving motion relative to the touch-interface in the second coordinate direction in which each of the concurrent touches has the second motion vector component in a same second direction as the other concurrent touches along a same second coordinate axis, compressing graphical content within the graphical user interface in the second coordinate direction toward a second reference datum line that is perpendicular to the first reference datum line and to an axis of the second coordinate direction if the magnitude of the second motion vector component in the second coordinate direction is larger than the magnitude of the first motion vector component in the first coordinate direction.

* * * * *